United States Patent
Stracke, Jr.

(10) Patent No.: US 8,914,229 B2
(45) Date of Patent: Dec. 16, 2014

(54) SYSTEMS AND METHODS FOR TRANSFERRING NAVIGATION DATA

(71) Applicant: Google Inc., Mountain View, CA (US)

(72) Inventor: John Richard Stracke, Jr., Chelmsford, MA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/841,336

(22) Filed: Mar. 15, 2013

(65) Prior Publication Data
US 2014/0278094 A1 Sep. 18, 2014

(51) Int. Cl.
*G01C 21/34* (2006.01)
*G01C 21/36* (2006.01)

(52) U.S. Cl.
CPC ............ *G01C 21/34* (2013.01); *G01C 21/3688* (2013.01)
USPC .......................................... 701/421; 701/491

(58) Field of Classification Search
CPC ............ G01C 21/3688; G01C 21/362; G01C 21/3438
USPC ......... 701/450–453, 491, 526, 533, 541, 420, 701/421
See application file for complete search history.

(56) References Cited

U.S. PATENT DOCUMENTS

| | | | |
|---|---|---|---|
| 6,600,990 B2 * | 7/2003 | Takenaga | 701/454 |
| 6,748,321 B2 * | 6/2004 | Watanabe et al. | 701/418 |
| 6,816,782 B1 * | 11/2004 | Walters et al. | 701/426 |
| 6,820,001 B2 * | 11/2004 | Norimoto | 701/428 |
| 6,839,630 B2 * | 1/2005 | Sakamoto | 701/428 |
| 7,672,778 B1 * | 3/2010 | Elliott | 701/417 |
| 8,060,297 B2 * | 11/2011 | Couckuyt et al. | 701/432 |
| 8,249,808 B2 * | 8/2012 | Lee | 701/494 |
| 8,374,782 B2 * | 2/2013 | Santesson et al. | 701/461 |

(Continued)

FOREIGN PATENT DOCUMENTS

| | | | | |
|---|---|---|---|---|
| EP | 1784655 A2 | | 5/2007 | |
| JP | 2001208552 A | * | 8/2001 | ............ G01C 21/00 |

(Continued)

OTHER PUBLICATIONS

JPO machine translation of JP 2007-78396 (original JP document published Mar. 29, 2007).*

(Continued)

*Primary Examiner* — Behrang Badii
*Assistant Examiner* — David Testardi
(74) *Attorney, Agent, or Firm* — McDermott Will & Emery LLP

(57) ABSTRACT

Systems and methods for transferring navigation data are provided. A system includes a map module configured to receive, at a first mobile device, the navigation data for navigating from a beginning location to a target destination. The navigation data includes at least one of the target destination, directions from the beginning location to the target destination, and map tiles covering a geographic area comprising the beginning location and the target destination. The system includes an extraction module configured to determine a portion of the navigation data, which includes at least one of the target destination, directions from a current location to the target destination, and a subset of the map tiles that cover a route from the current location to the target destination. The system includes a communications module configured to transmit the portion of the navigation data from the first mobile device to a second mobile device.

23 Claims, 5 Drawing Sheets

(56) References Cited

U.S. PATENT DOCUMENTS

| | | | |
|---|---|---|---|
| 8,386,172 B2* | 2/2013 | Sakakibara | 701/450 |
| 2002/0173908 A1 | 11/2002 | Sakamoto | |
| 2006/0271290 A1* | 11/2006 | Li | 701/213 |
| 2011/0021211 A1 | 1/2011 | Ohki | |
| 2011/0159858 A1* | 6/2011 | Yu et al. | 455/414.4 |
| 2012/0131212 A1* | 5/2012 | Tang et al. | 709/228 |
| 2012/0303263 A1 | 11/2012 | Alam et al. | |
| 2013/0080054 A1* | 3/2013 | Kutomi | 701/533 |
| 2013/0124563 A1* | 5/2013 | CaveLie et al. | 707/770 |
| 2013/0147846 A1* | 6/2013 | Kalai et al. | 345/660 |

FOREIGN PATENT DOCUMENTS

| | | | | |
|---|---|---|---|---|
| JP | 2001243596 A | * | 9/2001 | G08G 1/09 |
| JP | 2002365080 A | * | 12/2002 | G01C 21/00 |
| JP | 2003269977 A | * | 9/2003 | G01C 21/00 |
| JP | 2005241373 A | * | 9/2005 | G01C 21/00 |
| JP | 2007064951 A | * | 3/2007 | |
| JP | 2007078396 A | * | 3/2007 | |
| JP | 2008014881 A | * | 1/2008 | |
| WO | WO 01/88877 A1 | * | 11/2001 | |

OTHER PUBLICATIONS

JPO machine translation of JP 2003-269977 (original JP document published Sep. 25, 2003).*

JPO machine translation of JP 2001-208552 (original JP document published Aug. 3, 2001).*

* cited by examiner

SYSTEMS AND METHODS FOR TRANSFERRING NAVIGATION DATA

FIELD

The subject technology generally relates to navigation data processing and, in particular, relates to systems and methods for transferring navigation data.

BACKGROUND

A group of people traveling together in the same vehicle may rely on one person's mobile device to download, from a service provider, navigation data that provides directions to a certain destination. If that person's mobile device runs out of battery, then another person's mobile device may need to be used instead. However, the new mobile device may not necessarily have data coverage, and even if it does, it would need to re-download the navigation data from its own service provider, thereby causing the new mobile device to incur data charges for the same navigation data. The same problem would occur if the group decides to travel in different vehicles. In such a scenario, a mobile device for each vehicle would need to separately download the navigation data from its respective service provider, thereby causing multiple data charges to be incurred for downloading the same navigation data.

SUMMARY

According to various aspects of the subject technology, a system for transferring navigation data is provided. The system comprises a map module configured to receive, at a first mobile device, the navigation data for navigating from a beginning location to a target destination. The navigation data comprises at least one of the target destination, directions from the beginning location to the target destination, and map tiles covering a geographic area comprising the beginning location and the target destination. The system also comprises an extraction module configured to determine a portion of the navigation data. The portion of the navigation data comprises at least one of the target destination, directions from a current location to the target destination, and a subset of the map tiles that cover a route from the current location to the target destination. The system also comprises a communications module configured to transmit the portion of the navigation data from the first mobile device to a second mobile device.

According to various aspects of the subject technology, a computer-implemented method for transferring navigation data is provided. The method comprises receiving, at a first mobile device, the navigation data for navigating from a beginning location to a target destination. The navigation data comprises at least one of the target destination, directions from the beginning location to the target destination, and map tiles covering a geographic area comprising the beginning location and the target destination. The method also comprises determining a portion of the navigation data. The portion of the navigation data comprises at least one of the destination, directions from a current location to the target destination, and a subset of the map tiles that cover a route from the current location to the target destination. The method also comprises transmitting the portion of the navigation data from the first mobile device to a second mobile device.

According to various aspects of the subject technology, a machine-readable medium encoded with executable instructions for a method of transferring navigation data is provided. The method comprises receiving, at a first mobile device, the navigation data for navigating from a beginning location to a target destination. The navigation data comprises at least one of the target destination, directions from the beginning location to the target destination, and map tiles covering a geographic area comprising the beginning location and the target destination. The map tiles that cover the geographic area comprises one or more tiles that do not cover a route from a current location to the target destination. The method also comprises determining a portion of the navigation data. The portion of the navigation data comprises at least one of the destination, directions from the current location to the target destination, and a subset of the map tiles that cover the route from the current location to the target destination. The subset of map tiles excludes tiles that do not cover the route from the current location to the target destination. The method also comprises transmitting the portion of the navigation data from the first mobile device to a second mobile device. The directions from the current location to the target destination is transmitted before the subset of map tiles is transmitted.

Additional features and advantages of the subject technology will be set forth in the description below, and in part will be apparent from the description, or may be learned by practice of the subject technology. The advantages of the subject technology will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

DETAILED DESCRIPTION

In the following detailed description, numerous specific details are set forth to provide a full understanding of the subject technology. It will be apparent, however, that the subject technology may be practiced without some of these specific details. In other instances, structures and techniques have not been shown in detail so as not to obscure the subject technology.

Figure 1:
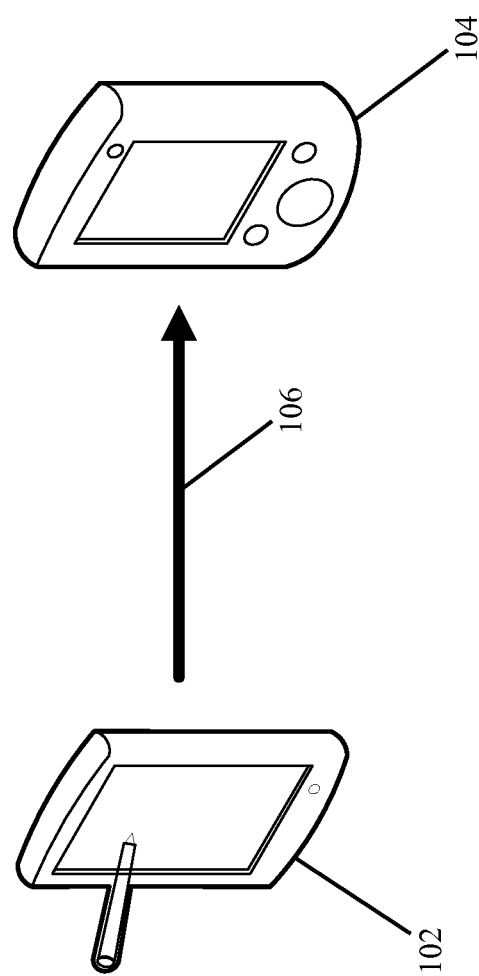
FIG. 1 illustrates an example of a first mobile device transferring navigation data to a second mobile device over a communication link, in accordance with various aspects of the subject technology.

According to various aspects of the subject technology, systems and methods for transferring navigation data between mobile devices are provided. FIG. 1 illustrates an example of first mobile device 102 transferring navigation data to second mobile device 104 over communication link 106, in accordance with various aspects of the subject technology. Once first mobile device 102 downloads navigation data from its service provider (e.g., for navigating from a beginning location to a target destination), first mobile device 102 can directly transfer the navigation data to second mobile device 104, thereby obviating the need for second mobile device 104 to re-download the navigation data from its own service provider and incur additional data charges.

In some aspects, the navigation data may be packaged such that only a portion of the navigation data (e.g., containing enough information to guide a user of second mobile device 104 to the target destination) is transmitted from first mobile device 102 to second mobile device 104. This may be particularly useful if first mobile device 102 is low on battery and can only transmit a limited amount of data before its battery runs out. In some aspects, the portion of the navigation data may be progressively transmitted such that higher priority data (e.g., directions from a current location to the target destination) is transmitted before lower priority data (e.g., map tiles covering a geographic area comprising the beginning location and the target destination). Thus, should the transmission be interrupted due to the battery running out, second mobile device 104 has a greater chance of receiving the more useful information for navigating to the target destination.

Although first mobile device 102 and second mobile device 104 are illustrated in FIG. 1 as mobile phones, first mobile device 102 and second mobile device 104 may be other devices, including, but not limited to, personal global positioning system (GPS) devices (including GPS devices installed in vehicles), devices using other location technologies (e.g., GLONASS, Galileo, Beidou, WiFi triangulation, etc.), laptop computers, tablet computers, personal digital assistants, netbook computers, and/or other electronic devices for receiving, transmitting, and/or presenting navigation data.

Figure 2:
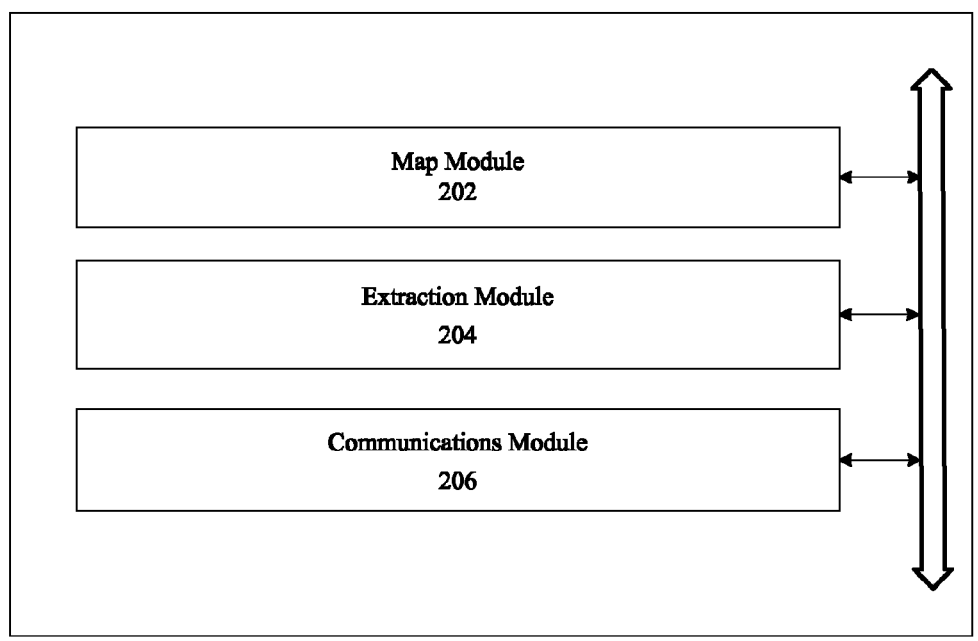
FIG. 2 illustrates an example of a system for transferring navigation data, in accordance with various aspects of the subject technology.

FIG. 2 illustrates an example of system 200 for transferring navigation data, in accordance with various aspects of the subject technology. System 200, for example, may be implemented as part of mobile device 102. System 200 comprises map module 202, extraction module 204, and communications module 206. These modules may be in communication with one another. In some aspects, the modules may be implemented in software (e.g., subroutines and code). In some aspects, some or all of the modules may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Additional features and functions of these modules according to various aspects of the subject technology are further described in the present disclosure.

Figure 3:
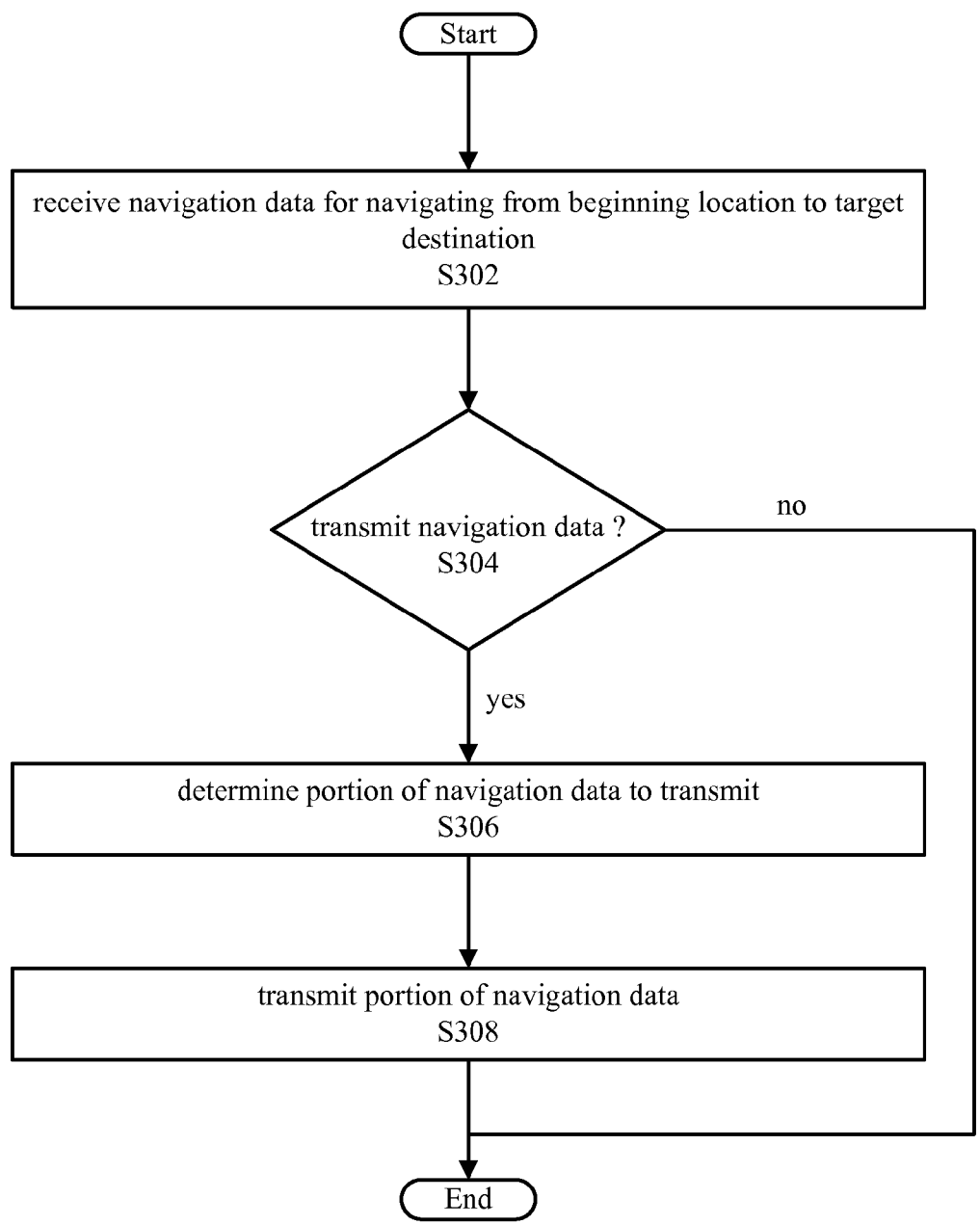
FIG. 3 illustrates an example of a method for transferring navigation data, in accordance with various aspects of the subject technology.

FIG. 3 illustrates an example of method 300 for transferring navigation data, in accordance with various aspects of the subject technology. System 200, for example, may be used to implement method 300. However, method 300 may also be implemented by systems having other configurations.

Although method 300 is described herein with reference to the examples in FIGS. 1, 2, 4A, 4B, and 4C, method 300 is not limited to these examples.

Figure 4:
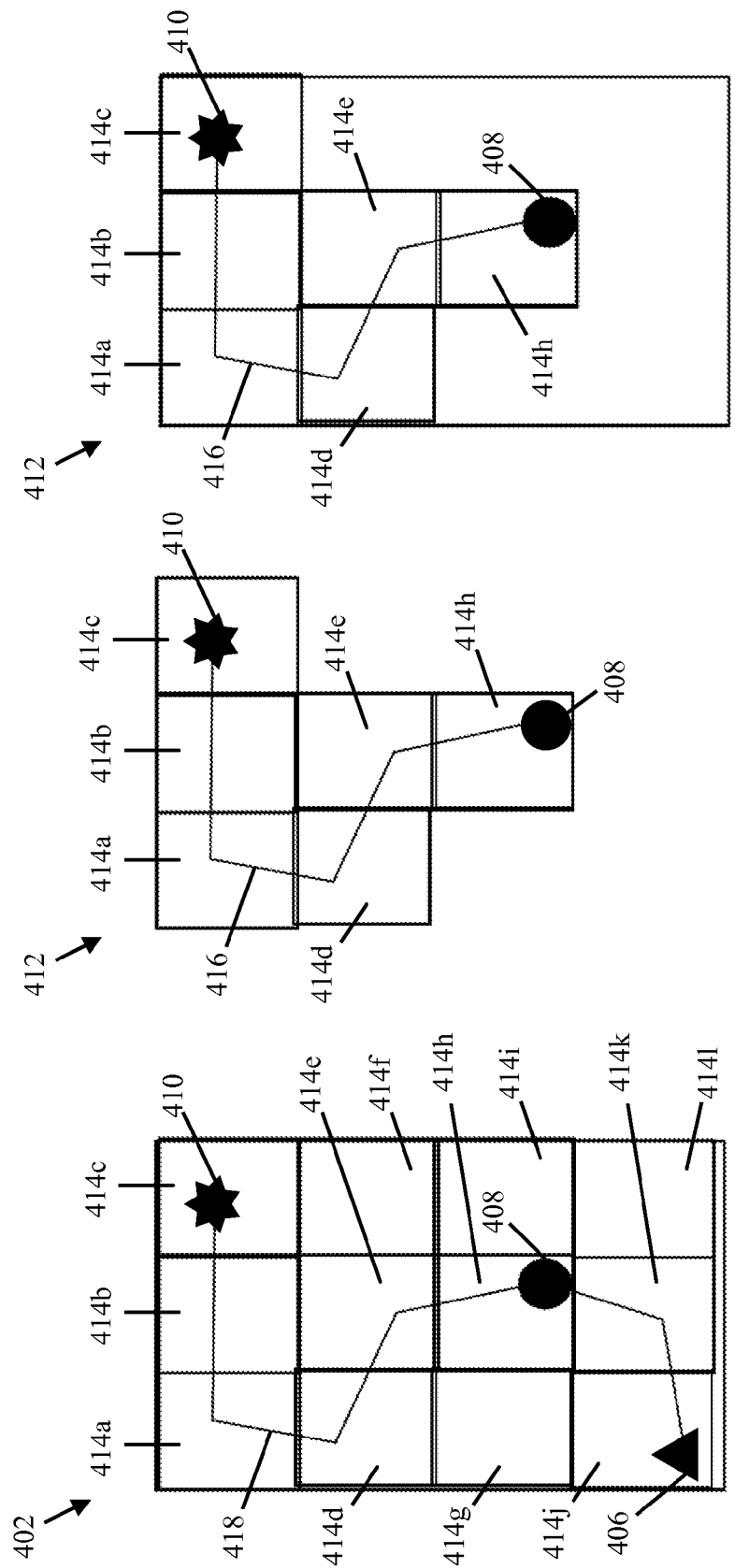
FIG. 4A illustrates an example of a set of map tiles as displayed on a first mobile device, in accordance with various aspects of the subject technology.
FIG. 4B illustrates an example of a subset of map tiles that may be transmitted to a second mobile device, in accordance with various aspects of the subject technology.
FIG. 4C illustrates an example of a subset of map tiles as displayed on a second mobile device, in accordance with various aspects of the subject technology.

According to step S302, map module 202 receives, at first mobile device 102, the navigation data for navigating from a beginning location to a target destination. The navigation data, for example, comprises at least one of the target destination, directions from the beginning location to the target destination, and map tiles covering a geographic area comprising the beginning location and the target destination. FIG. 4A illustrates an example of a set 402 of map tiles 414 (shown as 414a through 414l) that cover such a geographic area as displayed on first mobile device 102, in accordance with various aspects of the subject technology. For example, map tile 414j covers beginning location 406, map tile 414h covers current location 408, and map tile 414c covers target destination 410. Current location 408 is along path 418 between beginning location 406 and target destination 410, and may be a location of at least one of first mobile device 102 and second mobile device 104. Although current location 408 is shown in FIG. 4A as different from beginning location 406, current location 408 may also be the same as beginning location 406 in accordance with certain aspects of the subject technology. Map tiles 414a, 414b, 414c, 414d, 414e, 414h, 414j, and 414k cover path 418 from beginning location 406 to target destination 410. Set 402 of map tiles 414 also includes map tiles that do not cover path 418, such as map tiles 414f, 414g, 414i, and 414l.

According to S304, communications module 206 determines whether or not to transmit the navigation data to second mobile device 104. In some aspects, communications module 206 may make such a determination based on user input. For example, a user of either first mobile device 102 and/or second mobile device 104 may indicate a desire to transfer the navigation data from first mobile device 102 to second mobile device 104. For example, the user of first mobile device 102 may be presented with an option to send the navigation data to second mobile device 104, and communications module 206 may determine when the user selects that option. In some aspects, communications module 206 may determine whether or not to transmit the navigation data to second mobile device 104 based on a battery level of first mobile device 102 and whether any electronic devices, such as second mobile device 104, are within a proximity of first mobile device 102. For example, communications module 206 may detect that the battery level of first mobile device 102 is low and that second mobile device 104 is within the proximity of first mobile device 102. In this regard, communications module 206 may determine that the navigation data can be transmitted to second mobile device 104.

If communications module 206 determines not to transmit the navigation data to second mobile device 104, method 300 may terminate. Although FIG. 3 illustrates method 300 as terminating if communications module 206 determines not to transmit the navigation data to second mobile device 104, communications module 206 may also repeat step S304 periodically until communications module 206 determines to transmit the navigation data to second mobile device 104.

According to steps S304 and S306, if communications module 206 determines to transmit the navigation data to second mobile device 104, then extraction module 204 determines which portion of the navigation data to transmit. As discussed above, transmitting only a portion of the navigation data may be particularly useful if first mobile device 102 is low on battery and can only transmit a limited amount of data before the battery runs out. The portion of the navigation data may contain enough information to guide a user of second mobile device 104 to target destination 410. For example, the portion of the navigation data comprises at least one of target destination 410, directions from current location 408 to target destination 410, a subset of map tiles 414 that cover a route from current location 408 to target destination 410, and other information useful for guiding the user of second mobile device 104 to target destination 410.

FIG. 4B illustrates an example of a subset 412 of map tiles 414 that may be transmitted to second mobile device 104, in accordance with various aspects of the subject technology. As shown in FIG. 4B, subset 412 of map tiles 414 includes map tiles that cover route 416 from current location 408 to target destination 410 (e.g., map tiles 414a, 414b, 414c, 414d, 414e, and 414h, and excludes tiles that do not cover route 416 (e.g., map tiles 414f, 414g, 414i, 414j, 414k, and 414l in FIG. 4A). Thus, first mobile device 102 is able to provide second mobile device 104 with enough information to guide the user of second mobile device 104 to target destination 410 without having to expend resources in transmitting data that may not be as relevant (e.g., map tiles that do not cover route 416). This may be particularly beneficial if first mobile device 102 is running low on battery.

According to certain aspects, in addition to the more relevant information needed to guide the user of second mobile device 104 to target destination 410, the portion of the navigation data may include other information that may provide the user with additional context for navigating to target destination 410. Each tile of subset 412 of map tiles 414, for example, comprises at least one of primary information and secondary information. The primary information may be considered as part of the more relevant information needed to guide the user of second mobile device 104 to target destination 410. The primary information, for example, comprises at least a portion of route 416 and other suitable information for guiding the user to target destination 410. The secondary information, on the other hand, may be considered as part of the additional information that may be included with the portion of the navigation data to provide the user with additional context. For example, the secondary information may comprise at least one of a street not part of the route (e.g., cross-streets along the route), point of interest data (e.g., borders, parks, restaurants, gas stations, etc.), and other suitable contextual information for assisting with guiding the user to target destination 410. According to certain aspects, the portion of the navigation data to be transmitted to second mobile device 104 includes both the primary information and the secondary information.

According to step S308, communications module 206 transmits the portion of the navigation data (e.g., determined in step S306) from first mobile device 102 to second mobile device 104. For example, FIG. 4C illustrates an example of subset 412 of map tiles 414 as displayed on second mobile device 104, in accordance with various aspects of the subject technology. Communications module 206 may transmit the portion of the navigation data via at least one of Bluetooth (e.g., class 1, class 2, etc.), near field communication (NFC), WiFi (e.g., WiFi Direct), infrared, universal serial bus (USB), barcode scanning (e.g., scanning a barcode displayed on the screen of the sending device), and other suitable means for transmitting data.

As discussed above, the portion of the navigation data may be progressively transmitted such that higher priority data (e.g., directions from current location 408 to target destination 410) is transmitted before lower priority data (e.g., map tiles covering a geographic area comprising the beginning location and the target destination). Thus, should the transmission be interrupted due to the battery of first mobile device 102 running out, second mobile device 104 has a greater chance of receiving the more useful information for navigating to target destination 410.

For example, communications module 206 may transmit directions from current location 408 to target destination 410 before subset 412 of map tiles 414 is transmitted. Thus, second mobile device 104 would, at the very least, have the directions on how to navigate from current location 408 to target destination 410 should first mobile device 102 run out of battery before it can transmit subset 412 of map tiles 414 to second mobile device 104. In some aspects, communications module 206 may progressively transmit subset 412 of map tiles 414 along route 416 starting from one of subset 412 of map tiles 414 covering current location 408 (e.g., map tile 414h) and ending at one of subset 412 of map tiles 414 covering target destination 410 (e.g., map tile 414c). For example, communications module 206 may transmit subset 412 of map tiles 414 in the following order: 414h, 414e, 414d, 414a, 414b, and 414c. Thus, should the transmission of the portion of the navigation data to second mobile device 104 be interrupted, the user of second mobile device 104 has a greater chance of receiving information that would assist the user in navigating closer to the target destination 410 from current location 408.

As discussed above, each of subset 412 of map tiles 414 comprises primary information and secondary information. In some aspects, subset 412 of map tiles 414 may be progressively transmitted such that both primary information and secondary information for a respective tile is progressively transmitted. For example, communications module 206 may transmit subset 412 of map tiles 414 in the following order: 414h (with its primary information and secondary information), 414e (with its primary information and secondary information), 414d (with its primary information and secondary information), 414a (with its primary information and secondary information), 414b (with its primary information and secondary information), and 414c (with its primary information and secondary information).

In some aspects, subset 412 of map tiles 414 may be progressively transmitted such that the map tiles with their primary information are transmitted before their secondary information. For example, communications module 206 may transmit subset 412 of map tiles 414 in the following order: 414h (with its primary information), 414e (with its primary information), 414d (with its primary information), 414a (with its primary information), 414b (with its primary information), 414c (with its primary information), secondary information of 414h, secondary information of 414e, secondary information 414d, secondary information of 414a, secondary information of 414b, and secondary information of 414c.

According to certain aspects, after second mobile device 104 has received the portion of the navigation data from first mobile device 102, second mobile device 104 may transmit a request to its own service provider to obtain any remaining portion of the navigation data that it did not receive from first mobile device 102. In this way, second mobile device 104 can obtain any part of the navigation data needed to navigate to the target destination without having to incur additional data charges for the portion of the navigation data received from first mobile device 102.

Figure 5:
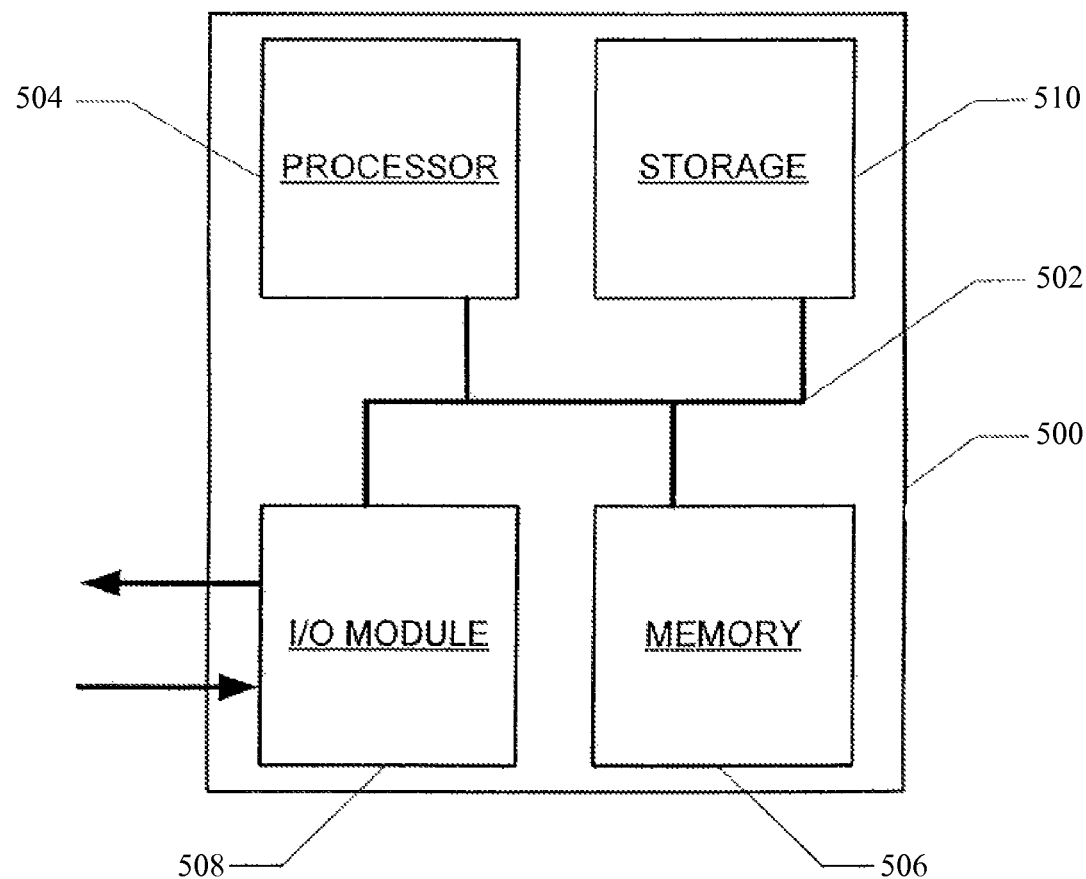
FIG. 5 is a block diagram illustrating components of a controller, in accordance with various aspects of the subject technology.

FIG. 5 is a block diagram illustrating components of controller 500, in accordance with various aspects of the subject technology. Controller 500 comprises processor module 504, storage module 510, input/output (I/O) module 508, memory module 506, and bus 502. Bus 502 may be any suitable communication mechanism for communicating information. Processor module 504, storage module 510, I/O module 508, and memory module 506 are coupled with bus 502 for communicating information between any of the modules of controller 500 and/or information between any module of controller 500 and a device external to controller 500. For example, information communicated between any of the modules of controller 500 may include instructions and/or data. In some aspects, bus 502 may be a universal serial bus. In some aspects, bus 502 may provide Ethernet connectivity.

In some aspects, processor module 504 may comprise one or more processors, where each processor may perform different functions or execute different instructions and/or processes. For example, one or more processors may execute instructions for transferring navigation data, and one or more processors may execute instructions for input/output functions.

Memory module 506 may be random access memory ("RAM") or other dynamic storage devices for storing information and instructions to be executed by processor module 504. Memory module 506 may also be used for storing temporary variables or other intermediate information during execution of instructions by processor 504. In some aspects, memory module 506 may comprise battery-powered static RAM, which stores information without requiring power to maintain the stored information. Storage module 510 may be a magnetic disk or optical disk and may also store information and instructions. In some aspects, storage module 510 may comprise hard disk storage or electronic memory storage (e.g., flash memory). In some aspects, memory module 506 and storage module 510 are both a machine-readable medium.

Controller 500 is coupled via I/O module 508 to a user interface for providing information to and receiving information from an operator of system 200. For example, the user interface may be a cathode ray tube ("CRT"), an LCD screen, or an LED screen for displaying information to an operator. The user interface may also include, for example, a keyboard, a mouse, a touchpad, and/or a touchscreen coupled to controller 500 via I/O module 508 for communicating information and command selections to processor module 504.

According to various aspects of the subject technology, methods described herein are executed by controller 500. Specifically, processor module 504 executes one or more sequences of instructions contained in memory module 506 and/or storage module 510. In one example, instructions may be read into memory module 506 from another machine-readable medium, such as storage module 510. In another example, instructions may be read directly into memory module 506 from I/O module 508, for example from an operator of system 200 via the user interface. Execution of the sequences of instructions contained in memory module 506 and/or storage module 510 causes processor module 504 to perform methods to transfer navigation data. For example, a computational algorithm for transferring navigation data may be stored in memory module 506 and/or storage module 510 as one or more sequences of instructions. Information such as the navigation data and/or other suitable information may be communicated from processor module 504 to memory module 506 and/or storage module 510 via bus 502 for storage. In some aspects, the information may be communicated from processor module 504, memory module 506, and/or storage module 510 to I/O module 508 via bus 502. The information may then be communicated from I/O module 508 to an operator of system 200 via the user interface.

One or more processors in a multi-processing arrangement may also be employed to execute the sequences of instructions contained in memory module 506 and/or storage module 510. In some aspects, hard-wired circuitry may be used in place of or in combination with software instructions to implement various aspects of the subject technology. Thus, aspects of the subject technology are not limited to any specific combination of hardware circuitry and software.

The term "machine-readable medium," or "computer-readable medium," as used herein, refers to any medium that participates in providing instructions to processor module 504 for execution. Such a medium may take many forms, including, but not limited to, non-volatile media and volatile media. Non-volatile media include, for example, optical or magnetic disks, such as storage module 510. Volatile media include dynamic memory, such as memory module 506. Common forms of machine-readable media or computer-readable media include, for example, floppy disk, a flexible disk, hard disk, magnetic tape, any other magnetic medium, a CD-ROM, DVD, any other optical medium, punch cards, paper tape, any other physical mediums with patterns of holes, a RAM, a PROM, an EPROM, a FLASH EPROM, any other memory chip or cartridge, or any other medium from which a processor can read.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

Furthermore, to the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology.

What is claimed is:

1. A system for transferring navigation data, the system comprising:
    a map module configured to receive, at a first mobile device, the navigation data for navigating from a beginning location to a target destination, the navigation data comprising the target destination, directions from the beginning location to the target destination, and map tiles covering a geographic area comprising a path from the beginning location to the target destination;
    an extraction module configured to determine a portion of the navigation data, the portion of the navigation data comprising the target destination, directions from a current location to the target destination, and a subset of the map tiles that cover a portion of the path from the current location to the target destination, wherein the current location is different from the beginning location and the current location is along the path from the beginning location to the target destination; and
    a communications module configured to transmit the portion of the navigation data from the first mobile device to a second mobile device based on a battery level of the first mobile device,
    wherein the portion of the navigation data excludes map tiles covering a portion of the path from the beginning location to the current location.

2. The system of claim 1, wherein the map tiles that cover the geographic area comprise one or more tiles that do not cover the portion of the path from the current location to the target destination.

3. The system of claim 1, wherein the current location is a location of at least one of the first mobile device and the second mobile device.

4. The system of claim 1, wherein the subset of map tiles excludes tiles that do not cover the portion of the path from the current location to the target destination.

5. The system of claim 1, wherein the communications module is configured to transmit the directions from the current location to the target destination before the subset of map tiles is transmitted.

6. The system of claim 5, wherein the communications module is configured to progressively transmit the subset of map tiles along the portion of the path from the current location to the target destination starting from one of the subset of map tiles covering the current location and ending at one of the subset of map tiles covering the target destination.

7. The system of claim 6, wherein each of the progressively transmitted subset of map tiles comprises at least one of primary information and secondary information, the primary information comprising a respective portion of the portion of the path from the current location to the target destination, the secondary information comprising at least one of a street not part of the portion of the path from the current location to the target destination and point of interest data.

8. The system of claim 6, wherein each of the progressively transmitted subset of map tiles comprises primary information, the primary information comprising a respective portion of the portion of the path from the current location to the target destination.

9. The system of claim 8, wherein the communications module is configured to transmit secondary information associated with each of the progressively transmitted subset of map tiles after the primary information of each of the subset of map tiles is progressively transmitted, the secondary information comprising at least one of a street not part of the portion of the path from the current location to the target destination and point of interest data.

10. The system of claim 9, wherein the communications module is configured to progressively transmit the secondary information along the portion of the path from the current location to the target destination starting from the secondary information associated with one of the subset of map tiles covering the current location and ending at the secondary information associated with one of the subset of map tiles covering the target destination.

11. The system of claim 1, wherein the communications module is configured to transmit the portion of the navigation data via at least one of Bluetooth, near field communication (NFC), WiFi, infrared, universal serial bus (USB), and barcode scanning.

12. A computer-implemented method for transferring navigation data, the method comprising:
    receiving, at a first mobile device, the navigation data for navigating from a beginning location to a target destination, the navigation data comprising the target destination, directions from the beginning location to the target destination, and map tiles covering a geographic area comprising a path from the beginning location to the target destination;
    determining a portion of the navigation data, the portion of the navigation data comprising the target destination, directions from a current location to the target destination, and a subset of the map tiles that covers a portion of the path from the current location to the target destination wherein the current location is different from the beginning location and the current location is along the path from the beginning location to the target destination; and
    progressively transmitting the portion of the navigation data from the first mobile device to a second mobile device based on a priority of the navigation data beginning with the directions from the current location to the target destination followed by the subset of the map tiles, wherein the portion of the navigation data excludes map tiles covering a portion of the path from the beginning location to the current location.

13. The method of claim 12, wherein the portion of the navigation data is transmitted from the first mobile device to the second mobile device without transmitting entirety of the navigation data.

14. A non-transitory machine-readable medium encoded with executable instructions for a method of transferring navigation data, the method comprising:
receiving, at a first mobile device, the navigation data for navigating from a beginning location to a target destination, the navigation data comprising the target destination, directions from the beginning location to the target destination, and map tiles covering a geographic area comprising a path from the beginning location to the target destination, the map tiles that cover the geographic area comprising one or more tiles that do not cover a portion of the path from a current location to the target destination;
determining a portion of the navigation data, the portion of the navigation data comprising the target destination, directions from the current location to the target destination, and a subset of the map tiles that cover the portion of the path from the current location to the target destination, wherein the current location is different from the beginning location and the current location is along the path from the beginning location to the target destination, the subset of map tiles excluding tiles that do not cover the portion of the path from the current location to the target destination; and
progressively transmitting the portion of the navigation data from the first mobile device to a second mobile device based on a priority of the navigation data, wherein the directions from the current location to the target destination have a higher priority than the subset of the map tiles.

15. The machine-readable medium of claim 14, wherein the subset of map tiles is progressively transmitted along the portion of the path from the current location to the target destination starting from one of the subset of map tiles covering the current location and ending at one of the subset of map tiles covering the target destination.

16. The machine-readable medium of claim 15, wherein each of the progressively transmitted subset of map tiles comprises primary information, the primary information comprising a respective portion of the portion of the path from the current location to the target destination.

17. The machine-readable medium of claim 16, wherein secondary information having a lower priority than the primary information and associated with each map tile of the progressively transmitted subset of map tiles is transmitted after the primary information of each map tile of the subset of map tiles is progressively transmitted, the secondary information comprising at least one of a street not part of the portion of the path from the current location to the target destination and point of interest data.

18. The non-transitory machine-readable medium of claim 14, wherein the portion of the navigation data is transmitted from the first mobile device to the second mobile device based on a battery level of the first mobile device.

19. A method for transferring navigation data for navigating from a beginning location to a target destination, the navigation data comprising the target destination, directions from the beginning location to the target destination, and map tiles covering a geographic area comprising a path from the beginning location to the target destination, the method comprising:
progressively receiving, at a first mobile device from a second mobile device, a first portion of the navigation data based on a priority of the navigation data, the first portion of the navigation data comprising the target destination, directions from a current location to the target destination, and a subset of the map files that cover a portion of the path from the current location to the target destination, wherein the current location is different from the beginning location and the current location is along the path from the beginning location to the target destination;
transmitting, from the first mobile device to a service provider, a request for a second portion of the navigation data, the second portion comprising data for navigating from the current location to the target destination that is not part of the first portion received from the second mobile device; and
receiving, at the first mobile device from the service provider, the second portion of the navigation data.

20. The method of claim 19, wherein the directions from the current location to the target destination have a higher priority than the subset of map tiles, and
wherein progressively receiving the first portion comprises receiving the directions from the current location to the target destination before the subset of map tiles is received.

21. The method of claim 19, wherein progressively receiving the first portion of the navigation data comprises progressively receiving the subset of map tiles along the portion of the path from the current location to the target destination starting from one of the subset of map tiles covering the current location and ending at one of the subset of map tiles covering the target destination.

22. The method of claim 21, wherein each of the progressively received subset of map tiles comprises primary information, the primary information comprising a respective portion of the portion of the path from the current location to the target destination.

23. The method of claim 22, wherein progressively receiving the subset of map tiles comprises receiving secondary information having a lower priority than the primary information and associated with each map tile of the progressively received subset of map tiles after the primary information of each map tile of the subset of map tiles is progressively received, the secondary information comprising at least one of a street not part of the portion of the path from the current location to the target destination and point of interest data.

\* \* \* \* \*